(12) United States Patent
Wick

(10) Patent No.: US 6,977,777 B1
(45) Date of Patent: Dec. 20, 2005

(54) ACTIVE OPTICAL ZOOM SYSTEM

(75) Inventor: David V. Wick, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/871,199

(22) Filed: Jun. 18, 2004

(51) Int. Cl.$^7$ ............................................. G02B 15/00
(52) U.S. Cl. ..................................................... 359/677
(58) Field of Search ............................... 359/676, 677, 359/683–693

(56) References Cited

U.S. PATENT DOCUMENTS

| | | | |
|---|---|---|---|
| 4,836,661 A * | 6/1989 | Ikemori | ....................... 359/676 |
| 6,369,954 B1 | 4/2002 | Berge et al. | |
| 6,421,185 B1 | 7/2002 | Wick et al. | |
| 6,473,241 B1 | 10/2002 | Wick et al. | |
| 6,538,823 B2 | 3/2003 | Kroupenkine et al. | |
| 6,778,328 B1 | 8/2004 | Aizenberg et al. | |
| 6,870,689 B2 * | 3/2005 | Yoshida | ....................... 359/683 |

OTHER PUBLICATIONS

D.V. Wick, et al., "Foveated imaging demonstration," Optics Express 10, 60-65 (2002).
T. Martinez, et. al., "Foveated, wide field-of-view imaging system using a liquid crystal spatial light modulator," Optics Express 8, 555-560 (2001).
E. C. Tam, "Smart electro-optical zoom lens," Optics Letters 17(5), 369 (1992).
A. F. Naumov, et al., "Control optimization of spherical modal liquid crystal lenses," Opt. Express 4(9), 344 (1999).
V. Laude, "Twisted-nematic liquid-crystal pixilated active lens," Opt. Comm. 153(1-3), 134 (1998).
Y. Takaki, et al., "Liquid-crystal active lens: A reconfigurable lens employing a phase modulator," Opt. Comm. 126(1-3), 123 (1996).
Acton, "Correction of static optical errors in a segmented adaptive optical system," Appl. Opt. 34(34), 7965 (1995).
l "Xinetics Inc: Deformable Mirrors," [retrieved on Apr. 8, 2004]. Retrieved from the Internet:<URL:http://www.xinetics.com>.
"Boston Micromachines Corporation," [retrieved on Apr. 8, 2004]. Retrieved from the Internet:<URL:http://www.bostonmicromachines.com>.
"Flexible Optical B.V.," [retrieved on Apr. 8, 2004]. Retrieved from the Internet:<URL:http://www.okotech.com>.

(Continued)

Primary Examiner—Scott J. Sugarman
Assistant Examiner—Darryl J. Collins
(74) Attorney, Agent, or Firm—Kevin W. Bieg

(57) ABSTRACT

An active optical zoom system changes the magnification (or effective focal length) of an optical imaging system by utilizing two or more active optics in a conventional optical system. The system can create relatively large changes in system magnification with very small changes in the focal lengths of individual active elements by leveraging the optical power of the conventional optical elements (e.g., passive lenses and mirrors) surrounding the active optics. The active optics serve primarily as variable focal-length lenses or mirrors, although adding other aberrations enables increased utility. The active optics can either be LC SLMs, used in a transmissive optical zoom system, or DMs, used in a reflective optical zoom system. By appropriately designing the optical system, the variable focal-length lenses or mirrors can provide the flexibility necessary to change the overall system focal length (i.e., effective focal length), and therefore magnification, that is normally accomplished with mechanical motion in conventional zoom lenses. The active optics can provide additional flexibility by allowing magnification to occur anywhere within the FOV of the system, not just on-axis as in a conventional system.

19 Claims, 6 Drawing Sheets

OTHER PUBLICATIONS

G. D. Love, "Wave-front correction and production of Zernike modes with a liquid-crystal spatial light modulation," Appl. Opt. 36(7), 1517 (1997).

D. V. Wick, et al., "Adaptive optical zoom" Opt. Eng. 43(1) 8 (2004).

T. Martinez, et al., "Non-mechanical zoom system," Proc. SPIE vol. 5234, p 375 (2004).

l "Varioptic Products Zooms" [retrieved on Mar. 31, 2004]. Retrieved from the Internet:<URL:http://www.varioptic.com>.

Benno Hendriks, "Through a Lens Sharply" IEEE Spectrum NA, Dec. 2004, 32-36.

S. Kuiper, "Variable-focus liquid lens for miniature cameras," Applied Physics Letters, vol. 85, No. 7, Aug. 16, 2004, 1128-1130.

T. Krupenkin, "Tunable Liquid microlens," Applied Physics Letters, vol. 82, No. 3, Jan. 20, 2003, 316-318.

International Publication No.: WO 2004/038480 A1, May 6, 2004, PCT, Kuiper, S.

* cited by examiner

ACTIVE OPTICAL ZOOM SYSTEM

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to optical zoom systems and, in particular, to an active optical zoom system that uses active optics to change the magnification or effective focal length of an optical imaging system, rather than mechanical lens motion.

BACKGROUND OF THE INVENTION

A zoom lens is simply an optical imaging system that changes its magnification or effective focal length while keeping the image plane stationary. Conventional technology requires that a continuous zoom lens have multiple optical elements and uses cams or gears to adjust the spacings between individual or groups of elements to vary the optical magnification. As a result, mechanical zoom lenses, such as those found on 35 mm cameras, typically take a few hundred milliseconds or more to vary magnification and are restricted to magnifying the area on-axis (i.e., the system must be directly pointed at the area to be magnified). Digital or electronic zoom, which is extremely fast and is not limited to on-axis magnification, is fundamentally different from optical zoom in that the individual pixels on the focal plane array at the image plane are simply remapped to larger areas in the display.

In FIG. 1 is shown an area-of-interest from an aerial reconnaissance image 10 that is expanded by 3× with digital zoom and with optical zoom. With digital zoom, the zoomed image 12 appears bigger, but there is no increase in information content (i.e., no increase in resolution). The individual pixels on the focal plane array are simply remapped to larger areas in the display. Thus, digital zoom is extremely fast and is not limited to on-axis magnification. Conversely, by changing the true magnification of the system, an optical zoom system actually increases the resolution over an area-of-interest, within the limits governed by diffraction and the individual pixel size on the focal plane array. In other words, when properly designed, the intrinsic amount of information over an area-of-interest can be increased in the optically zoomed image 14.

In surveillance, threat detection, and reconnaissance applications, a wide field-of-view (FOV) is often used to observe as large an area as possible, but this limits the achievable resolution over any specified area of interest of target. To achieve a higher resolution, such as required for target identification and tracking, a separate, narrow FOV is often desired. Therefore, two separate sensors are often used for acquisition, tracking, and pointing (ATP) applications: one with a low-resolution, wide FOV and the other with a narrow FOV and high resolution. Recently, pneumatically actuated systems that are very fast and dual FOV systems that rotate groups of lenses in and out of the optical path have been developed to achieve magnification. However, the size, weight, power requirements, robustness, and mechanical motion of these systems pose significant problems for space-based imaging systems. For the large entrance pupils required to achieve high resolution from space, a conventional zoom system would necessarily be extremely large and heavy.

These multiple FOV systems are also limited to on-axis magnification. Therefore, conventional, high-resolution systems must be gimbaled to point at different targets or areas of interest that are off-axis but within the field of view. The gimbals that are used to redirect the instantaneous FOV of a space-based imaging system tend to be large, heavy and require significant amounts of power, often weighing as much as the entire optical system. Depending on the size of the optics and the speed of the gimbal, they can draw hundreds or even thousands of watts of power to slew larger aperture systems. Therefore, even with state-of-the-art techniques, changing the magnification and slewing the optical system would still take hundreds of milliseconds, require significant power, and would likely induce unwanted jitter on a satellite or require momentum compensation.

Active or adaptive optics are playing an ever-increasing role in imaging and laser projection applications. Over the last 30 years, deformable mirrors (DMs) have revolutionized the imaging capability of astronomical observatories. Nearly every major observatory in the world utilizes some sort of adaptive optical system in a closed-loop architecture to compensate for aberrations caused by turbulence in the atmosphere. The success of adaptive optics in correcting atmospheric aberrations has sparked interest in the technology for other applications. For these other applications, adaptive optics offers the possibility of improving the flexibility and capabilities of imaging systems while reducing size, weight and potentially cost. In cases where closed-loop feedback is not used, the broader term "active optics" is often more appropriate.

Active optics, such as liquid crystal (LC) spatial light modulators (SLMs), can be used to adjust the diffraction-limited FOV of an imaging system very quickly without macroscopic moving parts. A wide FOV imaging system has been described that uses active optics to reduce the number of optical elements that are required and add adaptability. See D. V. Wick, et. al., "Foveated imaging demonstration," Optics Express 10, 60–65 (2002), T. Martinez et. al., "Foveated, wide field-of-view imaging system using a liquid crystal spatial light modulator," Optics Express 8, 555–560 (2001), U.S. Pat. No. 6,421,185 to Wick et al., and U.S. Pat. No. 6,473,241 to Wick et al. This foveated imaging system uses an active optic to selectively enhance resolution over a limited area-of-interest in a wide FOV imaging system. In this case, the multiple lenses required to minimize off-axis aberrations for a conventional wide FOV, low f/# system are replaced by a single, electrically addressed, LC SLM, minimizing the size and weight of the optical system. By using the SLM to correct aberrations at any field angle, high resolution is maintained over a limited area with lower resolution in peripheral areas, similar to the operation of the human eye. Furthermore, the area-of-interest can be moved anywhere within the FOV of the system on a millisecond time scale. In addition, the variable resolution in the image lends itself to video compression, reducing data transmission bandwidth requirements.

Liquid crystal SLMs have also been proposed to for use in a nonmechanical zoom lens. See E. C. Tam, "Smart electro-optical zoom lens," Optics Letters 17(5), 369 (1992). This optical zoom system uses electrically addressable continuous-phase SLMs in combination with refractive lenses to perform focusing and zooming. Tam contacted the SLM-based lens with a higher-power conventional imaging lens to provide a cascade lens with a variable focal length. Two cascade lens combinations were required to simultaneously change the effective focal length and maintain the image plane of the lens system. The zooming range could be optimized, depending on the focal length of the SLM-based lens and the overall system length. However, because Tam's SLM was in physical contact with the conventional lens, the dynamic range (i.e., zoom range) of his zoom system was limited. For example, Tam described a system in which the effective focal length changed from 9.8 cm to 14.8 cm, providing a zoom of 1.5×. Furthermore, because Tam uses SLM-based lenses to change only focus, his system is limited to zooming or magnifying on-axis, as with a conventional zoom lens. Furthermore, Tam does not use the flexibility afforded by active or adaptive optics to correct for other static or dynamic aberrations.

Accordingly, there remains a need for an active optical zoom system wherein the magnification or effective focal length of the system can be changed rapidly while keeping the image plane stationary. In particular, for space-based imaging systems used for surveillance and remote sensing, there exists a need for small, lightweight imaging sensors that are capable of quickly toggling between wide FOV for situational awareness and narrow FOV with high resolution for discrimination and identification.

SUMMARY OF THE INVENTION

The present invention is directed to an active optical zoom system for imaging an object, comprising an optical imaging system having a field of view, a system magnification, an optical axis, and an image plane; a plurality of passive optical elements on the optical axis to collect and focus light from the object within the field of view on the image plane; at least two active optical elements having variable focal lengths and separated on the optical axis from the passive optical elements; and means for controlling the focal lengths of the at least two active optical elements whereby the system magnification can be varied while keeping the image plane of the optical imaging system stationary. The at least two active optical elements can comprise liquid crystal spatial light modulators or deformable mirrors. The at least two active optical elements can further comprise means for variable optical tilt, as well as means to correct other higher order aberrations such as coma and astigmatism, to enable optical magnification of the object off of the optical axis and within the field of view of the optical imaging system.

The active optical zoom system behaves similarly to a mechanical zoom lens, allowing the user to view either a wide-angle image or zoom-in on an area of interest with correspondingly higher resolution. While active optics, such as LC SLMs or DMs, have been widely used for aberration correction, especially for atmospheric induced turbulence correction, and to provide focus control, the present invention integrates active optics into a conventional optical imaging system to vary system magnification.

The key to this concept is to create large changes in system magnification with very small changes in the focal lengths of individual active elements by leveraging the optical power of conventional, passive optical elements. In particular, the zoom range can be substantially increased by physically separating the active optics from the conventional optics. Active optics can thereby provide a varying system effective focal length, generating the flexibility in system magnification that is normally accomplished with mechanical motion. Incorporating active optics into a zoom imaging system can completely eliminate the need for cams, gears, pneumatic actuators, or rotating lens elements. The true magnification (i.e., optical zoom) of the imaging system can be varied without gross mechanical motion by adeptly integrating two or more active optical elements into the optical design. By simply readdressing the voltage scheme that is applied to the active optics, the focal lengths (i.e., defocus) of these adjustable elements, and thus the magnification of the system, can be changed on a millisecond time scale without macroscopic moving parts.

Additionally, by adding optical tilt along with defocus and smaller amounts of other higher order aberrations to the active optics, optical magnification can be achieved over any area within the wide FOV, not just along the optical axis as in a conventional system. Thus, the active optical zoom system can, for example, magnify the top right corner of a wide FOV, and by simply adjusting the voltages applied to the active optics, magnify the bottom left corner without moving the imaging system. In particular, this eliminates the need for, or at least reduces the requirements of, gimbals that slew the system to redirect its 'gaze'. Thus, replacing moving optics with stationary active optics can significantly enhance the speed and reduce the size, weight, and power requirements of a zoom imaging system. Integrating active optics may also increase system functionality, ruggedness, and life expectancy, while potentially decreasing overall system cost.

For example, a reconnaissance satellite could maintain a wide FOV for surveillance and threat detection. However, once an area-of-interest is determined, through either operator input or automated motion detection, an active optical zoom system could nonmechanically zoom-in on that area with increased resolution on a millisecond time scale for detailed intelligence gathering or target identification. High resolution could then be maintained on target without having to slew the optical system, as long as the target object is within the wide FOV of the system. Because the magnification is nonmechanical, multiple objects could be magnified in rapid succession without slewing the optical system. For ATP applications, the system could survey an area for threat detection, quickly zoom-in on multiple potential targets, and track one/multiple target(s) in real-time. The system can comprise means to optimize centroid tracking on the image plane by utilizing algorithms that exploit the zoom capability. In other words, the magnification would iteratively adjust to optimize tracking-lock based on the size and power of the tracking spot on the focal plane array. Thus, performance should surpass that of a conventional tracking system, because of the inherent ability to optimize performance using real-time feedback. By integrating a feedback loop, errors due to turbulence in the atmosphere, satellite jitter, or other dynamic aberrations could simultaneously be removed, similar to the operation of conventional adaptive optics systems on astronomical telescopes, significantly improving image fidelity.

Finally, the use of active optics enables the active optical zoom system of the present invention to correct for other static and dynamic aberrations. For commercial applications that use refractive elements (i.e., lenses), this allows for the use of cheaper, light-weight plastic lenses, which are of lower optical quality than glass lenses. For a reflective system, replicated or composite mirrors, which are lighter weight and cheaper to fabricate, can be used instead of higher optical quality polished glass mirrors. The active optics, already in the system for zooming, can be used to remove any residual aberrations, giving identical, or improved, imaging performance as can be obtained with the more expensive and heavier glass lenses or mirrors. Similarly, the active optics can also provide correction of aberrations that are inherent to a system, such as those created by imaging through the nosecone of a projectile. In addition, the active optics can be used to correct dynamic aberrations, such as those caused by turbulence in the atmosphere. By integrating a wavefront sensor with a control loop in an imaging system, dynamic aberrations can be removed at kHz rates, similar to what is currently done on astronomical telescopes using adaptive optical mirrors.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

FIG. 3A shows a wide field of view image. FIG. 3B shows a narrow field of view image.

FIG. 6A shows an image at low magnification. FIG. 6B shows an image at intermediate magnification. FIG. 6C shows an image at a zoomed magnification.

DETAILED DESCRIPTION OF THE INVENTION

Figure 1:
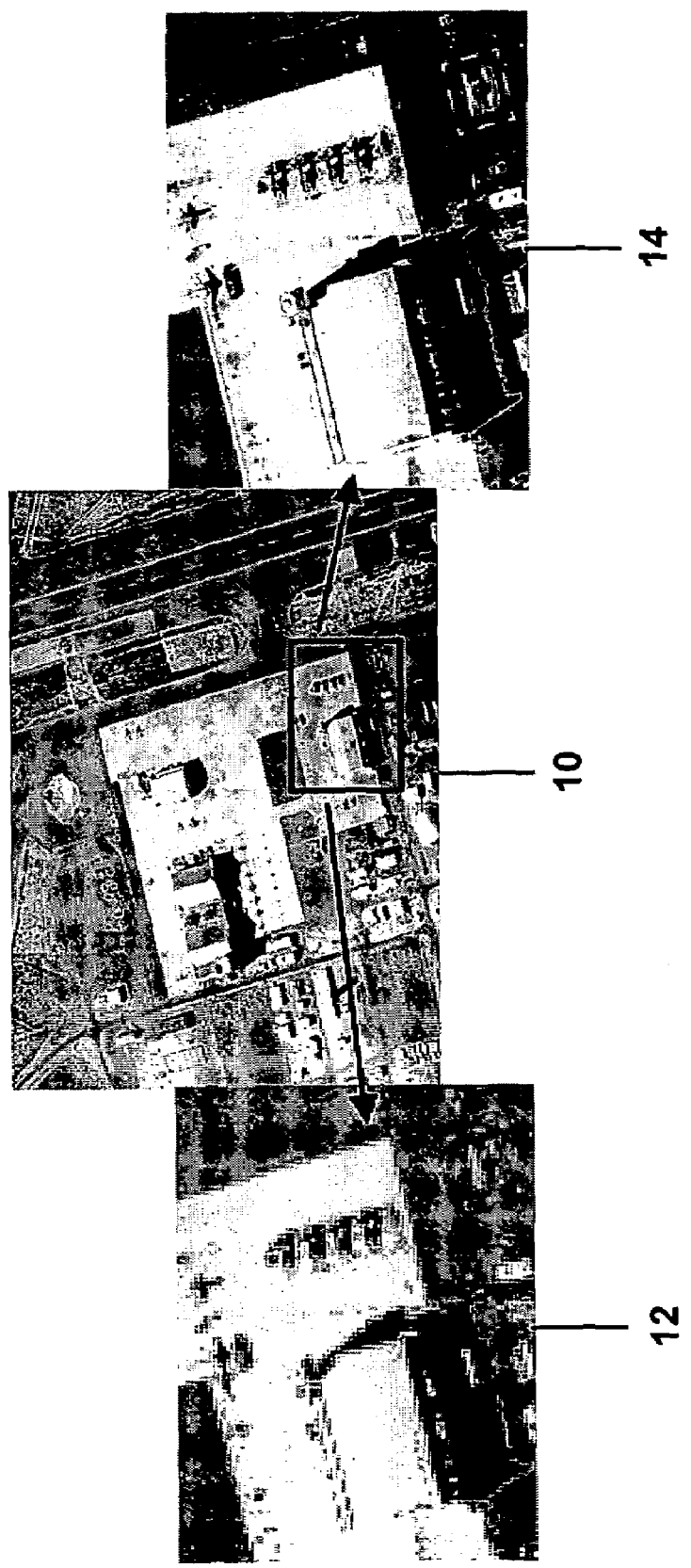
FIG. 1 shows an aerial reconnaissance image, electronic digital magnification of the image, and 3× optical magnification of the image.

The active optical zoom system of the present invention changes the magnification (or effective focal length) of an optical imaging system by utilizing two or more active optics in a conventional optical system. The key to this concept is to create relatively large changes in system magnification with very small changes in the focal lengths of individual active elements by leveraging the optical power of the conventional optical elements (e.g., passive lenses and mirrors) surrounding the active optics. The active optics serve primarily as variable focal-length lenses or mirrors, although adding other aberrations enables increased utility. The active optics can either be LC SLMs, used in a transmissive optical zoom system, or DMs, used in a reflective optical zoom system. By appropriately designing the optical system, these variable focal-length lenses or mirrors can provide the flexibility necessary to change the overall system focal length (i.e., effective focal length), and therefore magnification, that is normally accomplished with mechanical motion in conventional zoom lenses. The active optics can provide additional flexibility by allowing magnification to occur anywhere within the FOV of the system, not just on-axis as in a conventional system. They also permit residual system or environmental aberrations to be corrected. Furthermore, diffraction-limited performance can be achieved across any designed optical band, including the visible spectrum, with image magnification.

The active optical zoom system of the present invention can use SLMs as the active optics in a transmissive system. Liquid crystal SLMs have previously been used or proposed as active lenses. See A. F. Naumov et al., "Control optimization of spherical modal liquid crystal lenses," *Opt. Express* 4(9), 344 (1999); V. Laude, "Twisted-nematic liquid-crystal pixilated active lens," *Opt. Comm.* 153(1–3), 134 (1998); and Y. Takaki et al., "Liquid-crystal active lens: A reconfigurable lens employing a phase modulator," *Opt. Comm.* 126(1–3), 123 (1996). These are compact devices that can be used to manipulate optical wavefronts at up to kHz rates with minimal electrical requirements. A pixilated, LC SLM used in a monochromatic application is the transmissive analogue of a segmented deformable mirror; it imposes a user-controlled, spatially varying optical path across the wavefront. See D. S. Acton, "Correction of static optical errors in a segmented adaptive optical system," *Appl. Opt.* 34(34), 7965 (1995). In the case of a nematic LC, applying a small voltage to an individual pixel changes the index of refraction in the direction of propagation by reorienting the liquid crystal molecules, thus changing the optical retardance of that pixel. The optical path difference (OPD) created by applying the voltage is simply the change in index of refraction in the direction of propagation, $\Delta n_z$, multiplied by the thickness of the LC material, z, (i.e., OPD=$\Delta n_z$ z).

The active optical zoom system can also use DMs as the active optics in a reflective system. The active reflective elements can be conventional or micromachined deformable mirrors or microelectromechanical systems (MEMS) segmented mirrors. Deformable mirrors having a continuous membrane coated with a highly reflective material that have an array of underlying actuators for precise wavefront control are commercially available. See "Xinetics Inc: Deformable Mirrors," [retrieved on 2004-4-08]. Retrieved from the Internet:<URL:http://www.xinetics.com> and "Flexible Optical B.V., [retrieved on 2004-4-08]. Retrieved from the Internet:<URL:http://www.okotech.com>. Alternatively, the active optical zoom system can use small segmented MEMS mirrors to vary magnification. MEMS DMs, which rely on either electrostriction or piezoelectric forces for actuation, can manipulate optical wavefronts at up to kHz rates with minimal electrical requirements. Each segmented deformable mirror can be independently controlled to decouple actuator deflection and provide the proper amount of defocus/tilt to achieve diffraction-limited performance. See "Boston Micromachines Corporation," [retrieved on 2004-4-08]. Retrieved from the Internet:<URL: http://www.bostonmicromachines.com>.

DMs have the advantage of dispersionless operation, enabling wavelength insensitive, broadband imaging (e.g., visible, near-infrared, or mid-wave infrared). However, DMs typically operate over a smaller focal-length range than LC SLMs. DMs may also require a more complicated optical design, as multiple elements are not easily cascaded. The magnification of the all-reflective system is adjusted by changing the individual focal lengths of two or more DMs that act as variable focal-length lenses in the optical system. Changing the focal length of a DM is accomplished by systematically altering the optical path across the entire wavefront (i.e., adding or subtracting focus). Applying the appropriate voltage to each actuator deflects the DM and modifies the wavefront. The OPD created by applying the voltage is simply the index of refraction in the direction of propagation (typically air), nz, multiplied by the variation in the physical path length, $\Delta z$ (i.e., OPD=$n_z \Delta z$). The ability to vary the focal length of a DM depends on the maximum OPD (i.e., the maximum deflection) that can be obtained and the total number and geometric configuration of the actuators. Current DMs, both micromachined and conventional, can operate over rather limited focal-length ranges. The maximum deflection of a typical DM is less than 15 micrometers. However, improvements are being made to increase the deflection, and therefore the maximum OPD, in future DMs.

Focus control for both SLMs and DMs is accomplished by systematically adjusting the optical path across the entire active optic to add or subtract quadratically varying phase. By applying the appropriate voltage to each pixel, the optical path parallel to the axis (z) can be spatially varied in x and y to create a continuous (e.g., membrane DM) or a step-wise varying (e.g., segmented DM or SLM) optical wavefront that approximates the wavefront produced by a conventional spherical lens (i.e., using a SLM) or mirror (i.e., using a DM). Thus, by simply changing the voltages that are applied to the individual pixels of the SLMs or actuators of the DMs, the magnification of the system can be altered without macroscopic moving parts on a millisecond time scale. In fact, any aberration can be added or subtracted (i.e., focus is simply a low order aberration), providing a tremendous amount of flexibility. Therefore, the SLM or DM can act like a dynamically varying aspheric (instead of a purely spherical) lens or mirror by correctly modifying the OPD on each pixel to correct higher order aberrations. These correction factors can be calculated a prior and stored in the system. In this way, the addressing scheme provides the correct voltages to generate a required focal length and correct any aberrations that would be present without the complexity of using aspheric components. The dynamic range in focus dictates the total magnification that can be achieved by the imaging system and is determined by the maximum OPD of the active optic.

For a LC SLM or segmented DM, the pixelization of the device creates discontinuous OPD steps that approximate a smoothly varying optical path. The relative coarseness in these steps depends on both the maximum OPD required (i.e., dynamic range) and the total number of pixels and will dictate overall image fidelity. Note that if the OPD required to give the correct focus is greater than the dynamic range of the SLM, modulo $2\pi$ phase steps can be implemented, but this severely impacts the optical bandwidth of the system. See G. D. Love, "Wave-front correction and production of Zernike modes with a liquid-crystal spatial light modulator," *Appl. Opt.* 36(7), 1517 (1997).

For a membrane DM, the reflective surface of the device can be adjusted to produce a wavefront that is approximately the same as one produced by a conventional curved mirror, and the focal length of the DM can be varied within the limits set by the maximum deflection (i.e., dynamic range) and the number of actuators. The achievable resolution in wavefront control of DMs is limited by the total number of actuators and the influence of each actuator on every other actuator. It is the ability to accurately control the reflected wavefront that ultimately dictates image fidelity.

Typically, the active optical zoom system can be designed such that the spatial resolution is constant across the entire image in both the low-resolution, wide FOV or the high-resolution, narrow FOV mode—just like with a 35 mm mechanical camera zoom lens. To take full advantage of the resolution capability, the optical design can exploit the pixel size of the focal plane array for the high-resolution mode, such that the resolution capability in that mode is only limited by diffraction (i.e., the aperture size and effective focal length of the system). Furthermore, by adjusting the applied voltage to properly add optical tilt with focus, along with smaller amounts of higher order aberrations, the magnified FOV can be redirected without slewing or steering the optical system. This allows any point within the FOV to be magnified without physically moving some portion of the optical system. Thus, the object to be magnified does not have to lie on the optical axis, as in a conventional system.

While a single active optic can be used to vary focus in an imaging system, at least two active optics are required to change the magnification or effective focal length of a zoom system while keeping the image plane stationary (note that a single active optic can change the magnification slightly within the depth of focus of the system, but such a change is extremely small). The simplest example of an active optical zoom system is simply two active optics (i.e., variable lenses) separated by some distance such that their individual focal lengths can be varied to create a different sized image at a fixed location. However, this simple example, with just two elements, is very limited in zoom range and is necessarily long, due to limitations in dynamic range of available active optics.

A more practical system leverages the optical power of passive optical elements through judicious spacing of the elements. By leveraging the power of passive optics, the active optical zoom system of the present invention has larger zoom ranges and a smaller footprint (i.e., shorter length) than is possible with simply two active elements. The actual optical design of a particular system will necessarily depend on the performance requirements for that system. However, by integrating two or more active elements in an optical imaging system, such that the effective focal length or magnification of the system can be varied while maintaining a stationary image plane, an active optical zoom system can be designed to meet performance requirements, within the limitations of the active optics.

Figure 2:
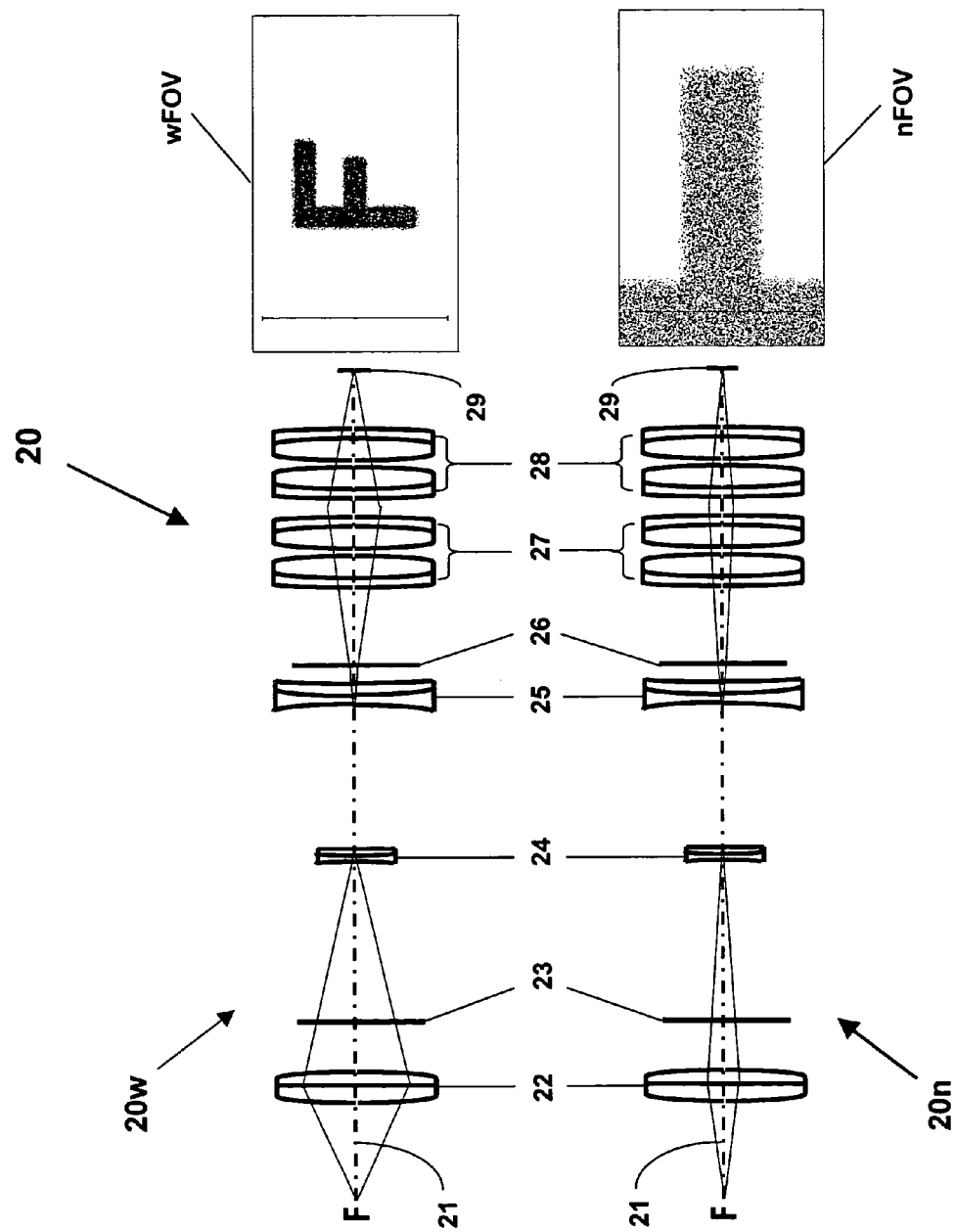
FIG. 2 shows a 3.9× active optical zoom system using liquid crystal spatial light modulators as the active optics.

In FIG. 2 is shown an optical design (not to scale) for a 3.9× active optical zoom system 20, using LC SLMs as the active optics. The optical zoom system 20 was designed using the ZEMAX® code. The active optical zoom system 20 for imaging an object F comprises an optical imaging system having a field of view, a system magnification, an optical axis 21, and an image plane 29. The system comprises a plurality of conventional, passive optical elements 22, 24, 25, 27, and 28, that collect and focus light from the object F within the field of view on the image plane 29, and two active optical elements 23 and 26 that are physically separated from and leverage the optical power of the passive optical elements 22, 24, 25, 27, and 28. The system 20 further comprises a means for controlling the focal lengths of the two active optical elements 23 and 26 whereby the system magnification can be varied while keeping the image plane 29 of the optical imaging system stationary. In this design, the two active optics 23 and 26 in the optical train were modeled as transmissive elements, but the dispersion of the LCs was not included. Also, the dynamic range of the active optics was limited to commercially available SLMs, which have focal length ranges from infinity to approximately 2500 mm. The two configurations represent the wide 20w and narrow 20n FOV modes. In the wide configuration 20w, there is a specific amount of defocus applied to each SLM 23 and 26 such that the image plane 29 has a wide FOV, as seen in image wFOV. When the defocus on the two SLMs 23 and 26 is appropriately changed (i.e., the voltages that are applied to the SLMs are changed), the magnification is changed by 3.9×, as seen in the zoomed image nFOV.

In the wide configuration 20w, the full FOV is 0.05 degrees, the effective focal length is 170 mm, and the entrance pupil diameter is 25 mm. The effective focal length is measured from the rear principle plane to the paraxial image plane. The first SLM 23 has a focal length equal to 11309 mm and the second SLM 26 has a focal length equal to 2500 mm. The focal lengths of the other lens groups 22, 24, 25, 27, and 28 are: 275, −25, −100, 43, and 43 mm. The spacings between lenses 22, 24, 25, 27, and 28, including the SLMs 23 and 26, from left to right are: 79, 171, 162, 40, 102, 43, and 8 mm. When the SLMs 23 and 26 are adjusted in the narrow configuration 20n, the first SLM 22 has a focal length equal to 2558 mm and the second SLM 26 has an infinite focal length. In this configuration, the effective focal length of the system 20n changes to 43 mm and the magnification is increased by 3.9×, as seen in the image plane nFOV. In both configurations 20w and 20n, the rms wavefront errors are diffraction limited over the visible spectrum (i.e., averaged over the F, d, and C wavelength lines). The overall system length for this design is about 0.6 m.

Although currently available LC SLMs lack the phase retardance and/or number of pixels necessary to adequately change the focal length of the individual element, a quasi-Fresnel zone plate can be created that mimics the behavior of a lens. The drawback of using the SLM in this fashion is the overall efficiency, since only a portion of the light is diffracted into the correct converging wavefront. In addition, some portion of the improperly focused light may make it to the image plane and add unwanted noise, masking the image of interest.

Figure 3A:
FIGS. 3A and 3B show images of an AF resolution bar using a 3.3× active optical zoom system with liquid crystal spatial light modulators as the active optics.
Figure 3B:
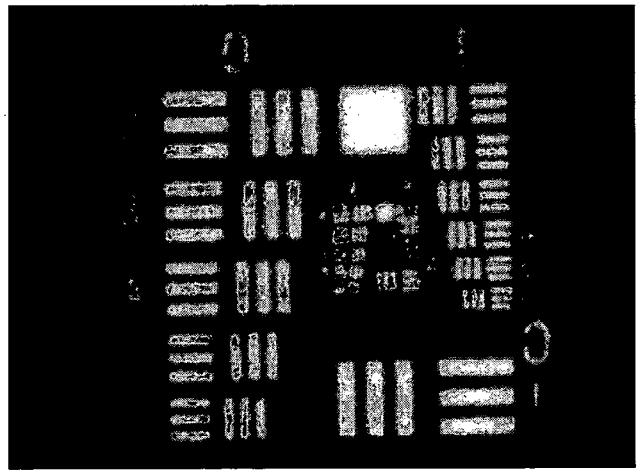

In FIGS. 3A and 3B are shown images of an AF resolution bar chart taken with an active optical zoom system similar to that shown in FIG. 2, using LC SLMs as the quasi-Fresnel zone plates. In FIG. 3A, the system is set to image a wide FOV, with the bar chart located in the upper right quadrant. When the voltages applied to the two SLMs in the optical train are changed, approximately 3.3× magnification is achieved, as shown by the narrow FOV image in FIG. 3B. Note that the bar chart is not centered in the wide FOV image shown in FIG. 3A, but is centered in the narrow FOV image in FIG. 3B. As noted above, magnification does not need to be on-axis, as it does with a conventional zoom system. By introducing optical tilt to the SLM (simply by changing the voltage scheme that is applied), any area within the FOV could be magnified, and that area can be changed on a millisecond time scale.

Figure 4:
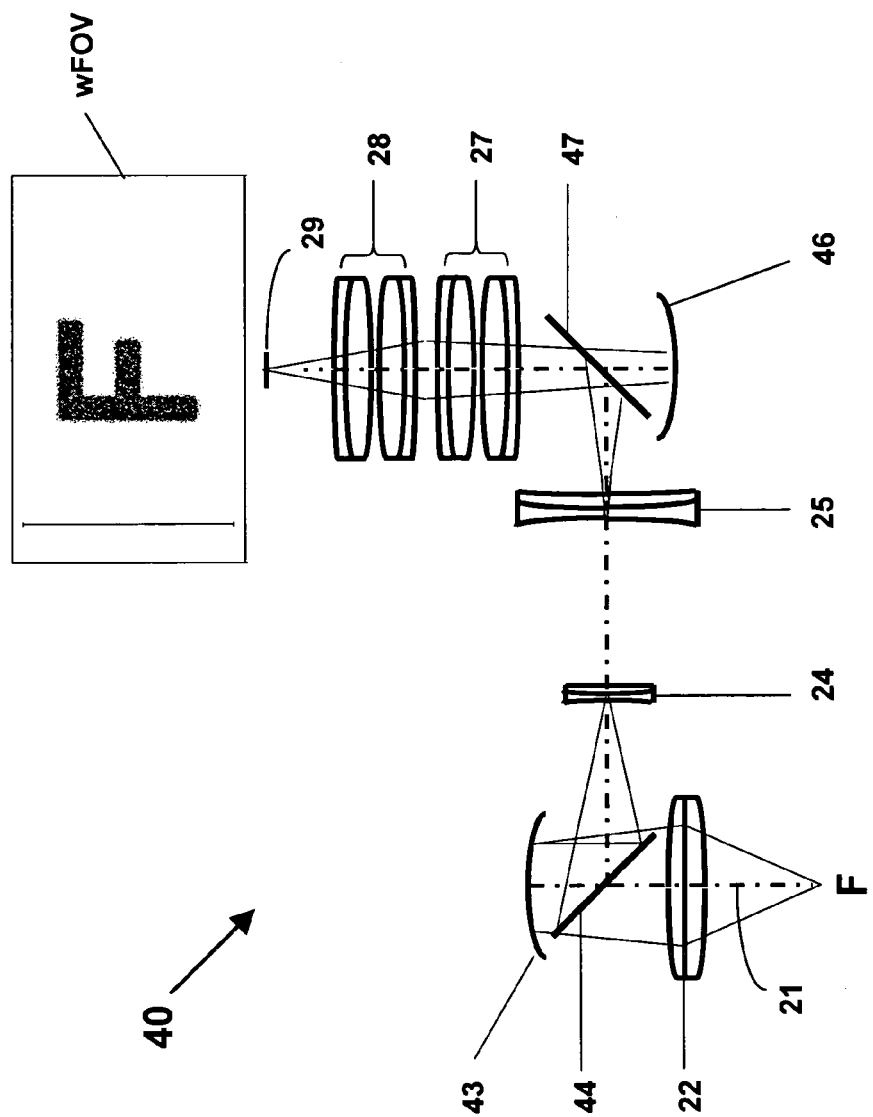
FIG. 4 shows a 3.9× active optical zoom system using deformable mirrors as the active optics, as laid out on an optical bench.

The active optical zoom system can also use reflective elements. For example, DMs can replace the SLMs in the active optical zoom system 20 shown in FIG. 2. In FIG. 4 is shown the same 3.9× optical system 40 as laid out on an optical bench, using DMs as the active optic. Two DMs 43 and 46, modeled as reflective elements, are located within the optical train. Beamsplitters 44 and 47 enable light to pass through to the mirrors 43 and 46 and be transported to the next optical element in the optical train. Only the wide FOV mode configuration 40w is shown. In the wide configuration 40w, the full FOV is 0.05 degrees, the effective focal length is 170 mm, and the entrance pupil diameter is 25 mm. The effective focal length is measured from the rear principle plane to the paraxial image plane. The first DM 43 has focal length equal to 11309 mm and the second DM 46 has a focal length equal to 2500 mm. The focal lengths of the other lens groups 22, 24, 25, 27, and 28 are: 275, −25, −100, 43, and 43 mm. The spacings between lenses 22, 24, 25, 27, and 28, including the DMs 43 and 46, from left to right are: 79, 171, 162, 40, 102, 43, and 8 mm. The overall system length for this design is about 0.6 m.

Figure 5:
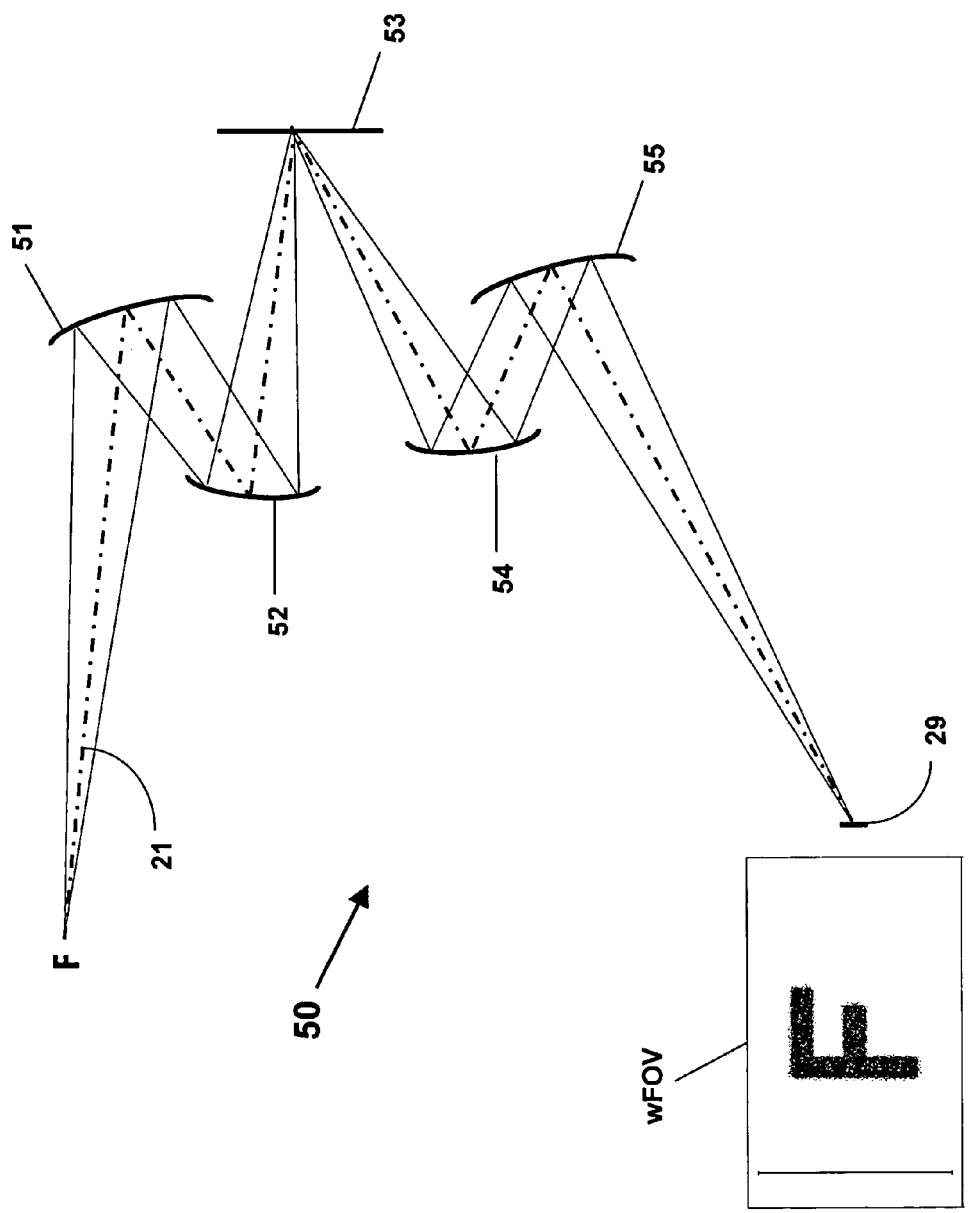
FIG. 5 shows an all-reflective, 2.2× active optical zoom system using deformable mirrors as the active optics in a folded design.

In FIG. 5 is shown a folded, all-reflective active optical zoom system 50 that uses two DMs 51 and 55 as the active optics and three static mirrors 52, 53, and 54 to create an image wFOV with multiple magnifications at the image plane 29. By using the DMs at slight angles, this system removes the need for beamsplitters or obscurations, and thus, all of the light makes it through the system. The aberrations that are caused by using mirrors off-angle can be corrected by the active optics.

Figure 6A:
FIGS. 6A–6C shows images taken with the all-reflective system.
Figure 6B:
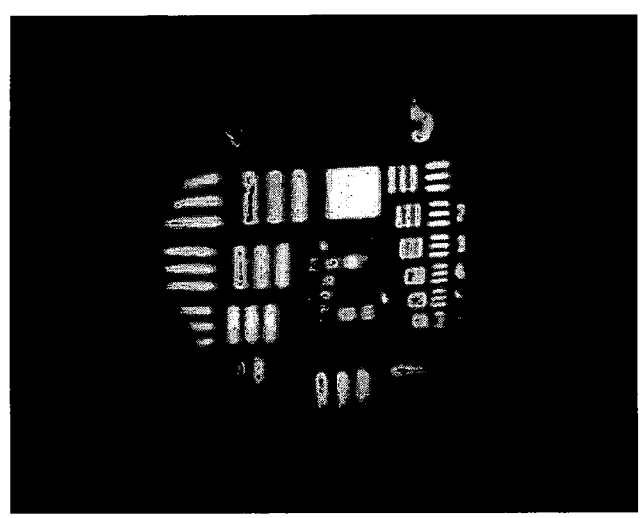
Figure 6C:
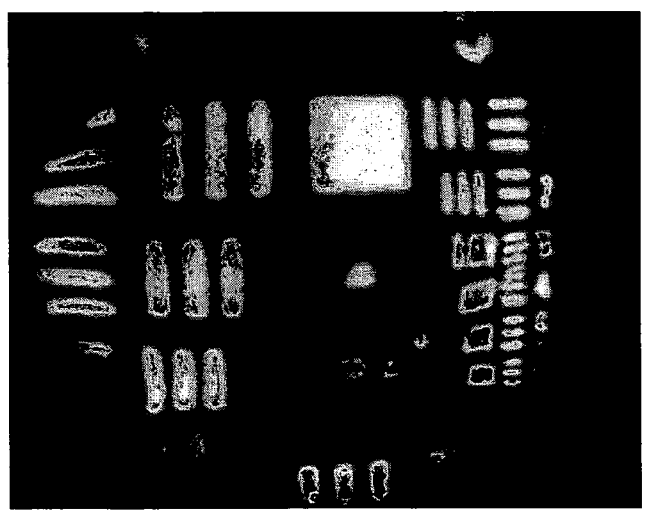

FIGS. 6A–6C show images taken with an active optical zoom system similar to the one shown in FIG. 5. FIG. 6A shows an image at low magnification. FIG. 6B shows an image at intermediate magnification. FIG. 6C shows an image at a zoomed magnification. The camera gain was adjusted for each of these images.

The present invention has been described as an active optical zoom system. It will be understood that the above description is merely illustrative of the applications of the principles of the present invention, the scope of which is to be determined by the claims viewed in light of the specification. Other variants and modifications of the invention will be apparent to those of skill in the art.

I claim:

1. An active optical zoom system for imaging an object, comprising:
   an optical imaging system having a field of view, a system magnification, an optical axis, and an image plane;
   a plurality of passive optical elements on the optical axis to collect and focus light from the object within the field of view on the image plane;
   at least two deformable mirrors having variable focal lengths and separated on the optical axis from the passive optical elements; and
   means for controlling the focal lengths of the at least two deformable mirrors whereby the system magnification can be varied while keeping the image plane of the optical imaging system stationary.

2. The active optical zoom system of claim 1, wherein the deformable mirrors comprise continuous membrane deformable mirrors.

3. The active optical zoom system of claim 1, wherein the deformable mirrors comprise segmented microelectromechanical systems mirrors.

4. The active optical zoom system of claim 1, wherein the plurality of passive optical elements comprises at least one lens.

5. The active optical zoom system of claim 1, wherein the plurality of passive optical elements comprises at least one mirror.

6. An active optical zoom system for imaging an object, comprising:
   an optical imaging system having a field of view, a system magnification, an optical axis, and an image plane;
   a plurality of passive optical elements on the optical axis to collect and focus light from the object within the field of view on the image plane;
   at least two active optical elements having variable focal lengths and separated on the optical axis from the passive optical elements;
   means for controlling the focal lengths of the at least two active optical elements whereby the system magnification can be varied while keeping the image plane of the optical imaging system stationary; and
   wherein the at least two active optical elements further comprise means for variable optical tilt to provide system magnification of the object off of the optical axis and within the field of view of the optical imaging system.

7. The active optical zoom system of claim 6, wherein the at least two active optical elements comprise a liquid crystal spatial modulator.

8. The active optical zoom system of claim 6, wherein the at least two active optical elements comprise a deformable mirror.

9. An active optical zoom system for imaging an object, comprising:
- an optical imaging system having a field of view, a system magnification, an optical axis, and an image plane;
- a plurality of passive optical elements on the optical axis to collect and focus light from the object within the field of view on the image plane;
- at least two active optical elements having variable focal lengths and separated on the optical axis from the passive optical elements;
- means for controlling the focal lengths of the at least two active optical elements whereby the system magnification can be varied while keeping the image plane of the optical imaging system stationary; and
- wherein the at least two active optical elements comprise means to correct for aberrations in the system.

10. The active optical zoom system of claim 9, wherein the aberration correction means comprises means to correct for static aberrations.

11. The active optical zoom system of claim 9, wherein the aberration correction means comprises means to correct for dynamic aberrations.

12. The active optical zoom system of claim 9, wherein the at least two active optical elements comprise a liquid crystal spatial modulator.

13. The active optical zoom system of claim 9, wherein the at least two active optical elements comprise a deformable mirror.

14. An active optical zoom system for imaging an object, comprising:
- an optical imaging system having a field of view, a system magnification, an optical axis, and an image plane;
- a plurality of passive optical elements on the optical axis to collect and focus light from the object within the field of view on the image plane;
- at least two active optical elements having variable focal lengths and separated on the optical axis from the passive optical elements;
- means for controlling the focal lengths of the at least two active optical elements whereby the system magnification can be varied while keeping the image plane of the optical imaging system stationary; and
- wherein the system magnification can be varied by greater than 1.5×.

15. The active optical zoom system of claim 14, wherein the at least two active optical elements comprise a liquid crystal spatial modulator.

16. The active optical zoom system of claim 14, wherein the at least two active optical elements comprise a deformable mirror.

17. An active optical zoom system for imaging an object, comprising:
- an optical imaging system having a field of view, a system magnification, an optical axis, and an image plane;
- a plurality of passive optical elements on the optical axis to collect and focus light from the object within the field of view on the image plane;
- at least two active optical elements having variable focal lengths and separated on the optical axis from the passive optical elements;
- means for controlling the focal lengths of the at least two active optical elements whereby the system magnification can be varied while keeping the image plane of the optical imaging system stationary; and
- means to optimize centroid tracking on the image plane.

18. The active optical zoom system of claim 17, wherein the at least two active optical elements comprise a liquid crystal spatial modulator.

19. The active optical zoom system of claim 17, wherein the at least two active optical elements comprise a deformable mirror.

* * * * *